United States Patent [19]

Phillips

[11] 4,121,638
[45] Oct. 24, 1978

[54] LOCKING ARRANGEMENT FOR VEHICLE-MOUNTED WHEEL COVER

[76] Inventor: Charles W. Phillips, 1405 SW. 8 St., Pompano Beach, Fla. 33060

[21] Appl. No.: 882,106

[22] Filed: Feb. 28, 1978

[51] Int. Cl.² .................................................. B65D 85/06
[52] U.S. Cl. .................................. 150/54 A; 70/259; 280/152.05
[58] Field of Search ........................ 150/54 A; 70/259; 280/152.05

[56] References Cited

U.S. PATENT DOCUMENTS

| | | | |
|---|---|---|---|
| 1,321,017 | 11/1919 | Draver | 150/54 A |
| 1,419,958 | 6/1922 | Collins | 150/54 A |
| 2,022,131 | 11/1935 | Lyon | 150/54 A |
| 2,042,949 | 6/1936 | Lyon | 150/54 A |
| 2,073,749 | 3/1937 | Lyon | 150/54 A |
| 2,109,670 | 3/1938 | Lyon | 150/54 A |
| 2,297,579 | 9/1942 | Norberg | 70/259 |
| 2,328,339 | 8/1943 | Heath | 70/259 |
| 2,844,954 | 7/1958 | Marugg | 70/259 |
| 3,918,599 | 11/1975 | Porter | 70/259 |

FOREIGN PATENT DOCUMENTS 227,102   9/1962   Austria ....................................... 70/259

Primary Examiner—Ro E. Hart
Attorney, Agent, or Firm—Oltman and Flynn

[57] ABSTRACT

The present locking arrangement is attached to the inner side of a wheel cover for a spare wheel and tire assembly which is mounted on the outside of a vehicle. Slotted plates attached to the wheel cover receive the opposite ends of a bar, which extends diametrically across the inner side of the wheel cover. This bar is transversely bent at one end, at least, for retention in the slotted plate there. A padlock coacts with the bar and at least one of the slotted plates to retain the corresponding end of the bar in that plate.

10 Claims, 6 Drawing Figures

LOCKING ARRANGEMENT FOR VEHICLE-MOUNTED WHEEL COVER

BACKGROUND OF THE INVENTION

Various arrangements have been proposed heretofore for mounting a spare tire, usually assembled to a spare wheel, in a cover on the outside of an automotive vehicle. Examples of such prior proposals are disclosed in the following U.S. Pat. Nos.: Tinker 2,010,770; Lyon 2,022,131; Lyon 2,042,949; Lyon 2,073,749; Lyon 2,109,670; and Lyon 2,440,805.

None of the prior spare tire mounting arrangements of which I am aware included a convenient and adequate anti-theft locking arrangement.

SUMMARY OF THE INVENTION

The present invention is directed to a novel locking arrangement for use on a cover for a spare wheel and tire assembly which is mounted on the outside of an automotive vehicle, such as on a back door of a van.

A principal object of this invention is to provide such an arrangement for preventing theft of the cover and/or the spare wheel and tire from the outside of the vehicle.

Another object of this invention is to provide such a locking arrangement which is readily applied to the wheel cover and may be unlocked conveniently by an authorized user only.

Further objects and advantages of this invention will be apparent from the following detailed description of two presently-preferred embodiments thereof, which are shown in the accompanying drawings in which.

Before explaining the disclosed embodiments of the present invention in detail, it is to be understood that the invention is not limited in its application to the details of the particular arrangements shown since the invention is capable of other embodiments. Also, the terminology used herein is for the purpose of description and not of limitation.

Figure 1:
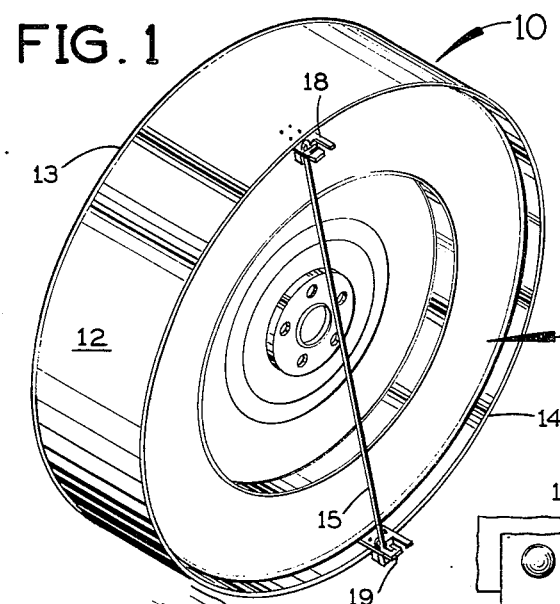
FIG. 1 is a perspective view of a first embodiment of the present locking arrangement.

Referring first to FIG. 1, the present locking assembly is provided on a wheel cover 10 which snugly receives a spare wheel and tire of an automotive vehicle, such as a van. The assembly of the spare wheel and tire is indicated in its entirety by the reference character 11 in FIG. 1. The wheel cover has a cylindrical peripheral wall 12 with an inside diameter just slightly larger than the outside diameter of the spare wheel and tire assembly 11, so that the latter fits snugly but slidably inside the wall 12. The wheel cover has an outer end wall at 13 which partially or completely covers the spare wheel and tire assembly at the axial side of this assembly which faces away from the vehicle on which the spare wheel is mounted. The wheel cover is open at its opposite axial side, as shown at 14 in FIG. 1, to permit it to be slidably assembled endwise over the spare wheel and tire assembly. At this axial side the spare wheel is mounted on a rear door (in the case of a van) or some other part of the vehicle body by a mounting arrangement which forms no part of the present invention and therefore is not illustrated.

The wheel cover 10 may be a plastic or sheet metal body.

Figure 2:
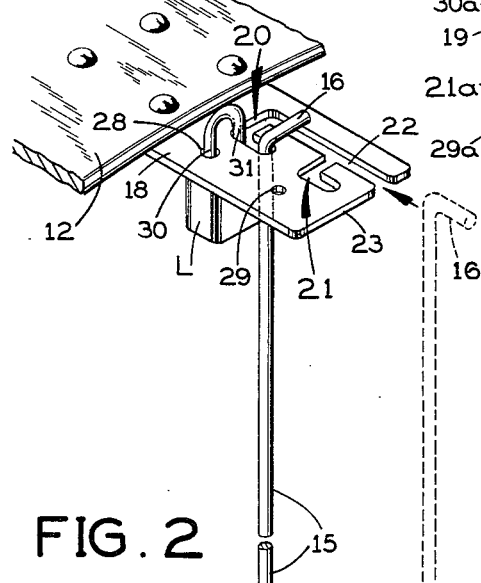
FIG. 2 is an enlarged perspective view of this locking arrangement.

In accordance with the present invention, a straight, elongated, rigid bar 15 is locked to the wheel cover 10, extending diametrically across its open axial side, as shown in FIG. 1, to prevent the removal of the wheel cover and/or the spare wheel and tire assembly. As best seen in FIG. 2, the bar 15 has a transversely bent upper end segment 16 and a transversely bent lower end segment 17, both extending at right angles to the bar at the same side of the bar. A pair of slotted plates 18 and 19 are rigidly fastened to the cylindrical peripheral wall 12 of the wheel cover at diametrically opposite locations for receiving the respective opposite ends of the bar.

Figure 3:
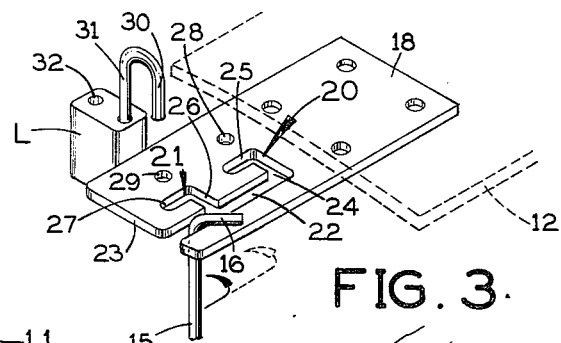
FIG. 3 is a fragmentary exploded perspective view of the upper end of this locking assembly partly assembled.

As shown in FIG. 3, the upper plate 18 is formed with an inner L-shaped slot 20, an outer L-shaped slot 21, and an additional entry slot 22 leading into both L-shaped slots. The entry slot 22 extends axially of the wheel cover and it is open at the edge 23 of the plate 18 away from the wheel cover.

The inner L-shaped slot 20 has a first leg 24 which extends on one side of the entry slot 22 away from the latter's closed inner end in a direction circumferentially of the wheel cover. A second leg 25 of the inner L-shaped slot extends from the opposite end of its circumferential first leg 24 axially outward away from the wheel cover and parallel to the entry slot 22.

The outer L-shaped slot 21 has a first leg 26 which extends on the same side of the entry slot 22 circumferentially of the wheel cover, intersecting the entry slot at a location axially outward from the inner L-shaped slot 20. The outer L-shaped slot 21 has a second leg 27 which extends from the opposite end of its circumferential first leg 26 axially outward from the wheel cover and parallel to the entry slot 22.

With this arrangement, the upper end of the bar 15 just below its bent upper end segment 16 can be slidably inserted axially into the entry slot 22, entering the latter at the edge 23 of the plate away from the wheel cover. The bar can be moved from the entry slot 22 laterally into either of the L-shaped slots 20 and 21, sliding along the circumferential first leg 24 or 26 of this L-shaped slot and then into the axial second leg 25 or 27 of this slot until it engages the closed end of this leg, as shown in FIG. 1.

The choice of the L-shaped slot 20 or 21 in which the bar 15 will be seated depends upon the axial dimension of the spare wheel and tire assembly 11, with a wider-tired assembly requiring that the outer L-shaped slot 21 be used, whereas the inner slot 20 would be used when the tire is of smaller axial width.

The upper plate 18 has a pair of openings 28 and 29, respectively, on the opposite side of the L-shaped slots 20 and 21 from the entry slot 22. The opening 28 is located axially outward from the wheel cover substantially the same distance as the intersection between the circumferential and axial legs 24 and 25 of the inner L-shaped slot 20. The other opening 29 is positioned axially outward from the wheel cover substantially the same distance as the intersection between the circumferential and axial legs 26 and 27 of the outer L-shaped slot 21.

Each of these openings 28 and 29 is shaped and dimensioned to slidably pass the free end of one leg 30 of a U-shaped link of a padlock L of conventional design. The opposite leg 31 of this U-shaped link is pivotally and slidably reciprocably mounted in the body of the padlock so that the free end of its leg 30 may be moved between an extended position (FIG. 1) and a locking position (FIG. 2) extending down into a locking recess 32 located in the body of the padlock away from the pivoted leg 31. A key (not shown) is provided for releasing the free end of the U-shaped link from its locking position in the body of the padlock, when desired.

After the upper end of the bar 15 has been seated in the closed end of either L-shaped slot 20 or 21 in the upper plate below the upper plate 18. After the padlock leg 31 has reached the intersection between the circumferential and axial legs of the L-shaped slot 20 or 21 in which the upper end of the bar 15 is now seated, the U-shaped link of the padlock is rotated until the free end of its leg 30 registers with the adjacent opening 28 or 29, and then this leg is pushed down through this opening into locking engagement in the body of the padlock at the recess 32. FIG. 2 shows this final, locking position of the padlock with the pivoted leg 31 of its U-shaped link in the corner of the U-shaped inner slot 20 in which the upper end of bar 15 is seated, and the other leg 30 of this U-shaped link of the padlock extending down through the opening 28 and locked in the padlock body. In this position of the parts, the upper end of the bar 15 is locked in place in the upper plate 18 and cannot be removed as long as the padlock remains locked and in place, as shown in FIG. 2.

The lower plate 19 has a slot arrangement identical to that of the upper plate 18. Elements of the slot arrangement in the lower plate which correspond to those of the slot arrangement in the upper plate are given the same reference numerals, but with a "a" suffix added. The same is true of the lower padlock La which coacts with the lower plate and the lower end of the bar 15.

Figure 4:
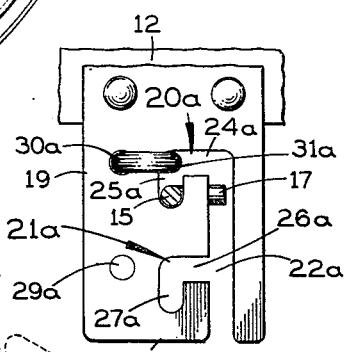
FIG. 4 is a top plan view of the lower end of this locking assembly, taken from the line 4—4 in FIG. 2.

It will be understood that when the upper end of the bar is inserted into the slotted upper plate 18, the lower end of the bar will be inserted simultaneously in the same manner into the lower plate 19, with the transversely bent lower end 17 of the bar 15 extending below the lower plate as illustrated in FIG. 2. The lower padlock La is applied to the lower plate 19 in the same manner as already described in detail for the upper padlock L and the upper plate 18. When the lower padlock La is assembled in place and locked, as shown in FIGS. 2 and 4, the lower end of the bar is locked in place in the lower plate 19 and cannot be removed as long as this padlock remains locked in place.

It will be evident from the foregoing description, taken in conjunction with FIGS. 1–4, that this locking arrangement may be readily applied to the wheel cover at its inner side (next to the vehicle) after the wheel cover has been slipped over a spare wheel and tire assembly mounted on the outside of the vehicle body. The bar 15 may be inserted down between the open inner side of the wheel cover and the adjacent panel of the vehicle body and then slid into the appropriate L-shaped slots in the upper and lower plates 18 and 19, after which the upper and lower padlocks may be applied, as described. There need be only enough clearance between the open inner side of the wheel cover and the adjacent panel of the vehicle body to permit the very limited manipulation of the rod 15 and the padlocks axially of the wheel cover which is required for this assembly to be carried out. Once the padlocks are in place and locked, only an authorized user can remove the wheel cover.

Figure 5:
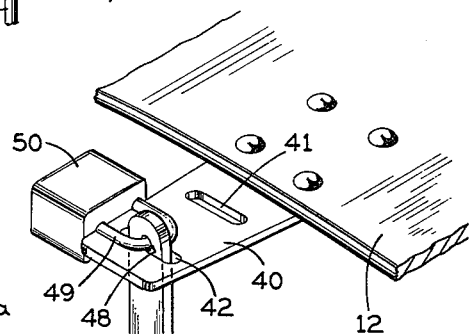
FIG. 5 is a perspective view, broken at the middle, of a locking bar in a second embodiment of this invention.
Figure 5:
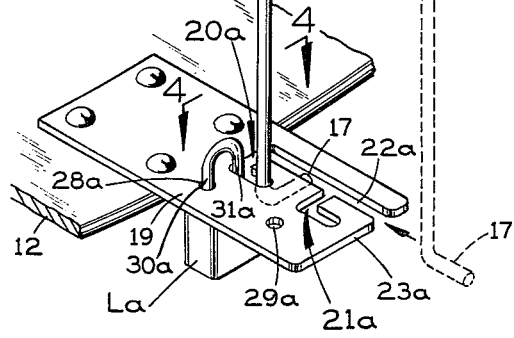
Figure 6:
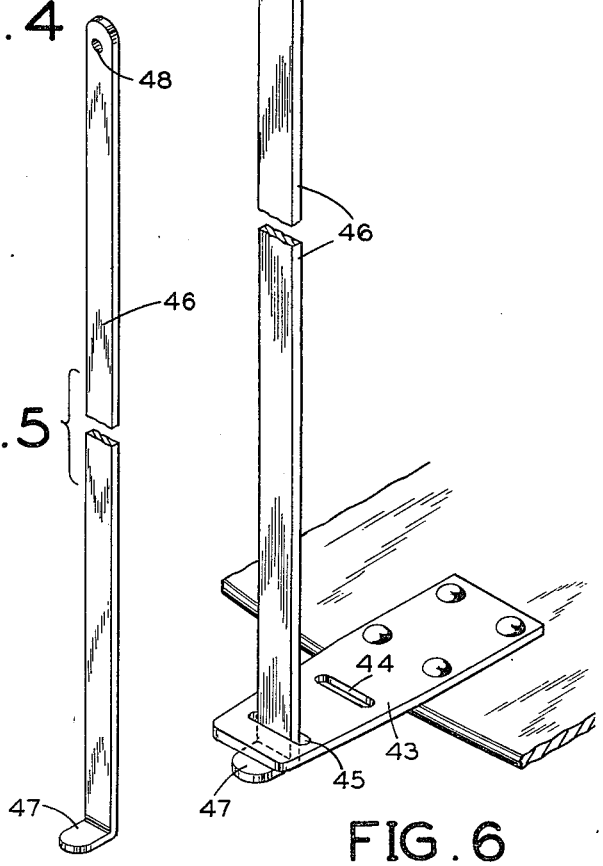
FIG. 6 is a perspective view, broken at the middle, showing the locking assembly in accordance with this second embodiment of the invention in its fully assembled condition.

In the alternative embodiment of the invention shown in FIGS. 5 and 6 a slotted upper plate 40 and a slotted lower plate 43 are attached to the cylindrical side wall 12 of the wheel cover at diametrically opposite locations. The upper plate 40 is formed with a straight inner slot 41 and an identical outer slot 42, each elongated circumferentially of the peripheral wall 12 of the wheel cover. The outer slot 42 is, of course, located axially farther away from the wheel cover than the inner slot 41. The lower plate 43 is formed with similar slots 44 and 45, which are respectively aligned with the slots 41 and 42.

The locking bar 46 is of oblong cross-section, with a width and thickness enabling it to pass slidably through each of these slots in the upper and lower plates 40 and 43. The lower end 47 of this bar is bent outward at a 90 degree angle from the remainder of the bar in a direction away from the wheel cover so as to underlie the outside of the bottom plate 43, as shown in FIG. 6, when the bar is received in either slot 44 or 45 in this plate.

Near its upper end in FIGS. 5 and 6 the bar 46 is formed with an opening 48 which slidably passes the U-shaped pivoted link 49 of a conventional key-operated padlock 50. When the bent lower end 47 of the bar closely underlies the outside of the lower plate 43, as shown in FIG. 6, the opening 48 near the upper end of the bar is positioned closely above the outside of the upper plate 40. Consequently, when the U-shaped link 49 of the padlock is inserted through the bar opening 48 and then locked in the body of the padlock, it closely overlies the outside of the upper plate 40. Therefore, at each end the bar 46 is closely assembled to the plates 40 and 43 and cannot be disassembled from them as long as the padlock 50 remains locked.

Preferably, the bar 46 is assembled to the plates 40 and 43 at the open inner side of the wheel cover by sliding the end where its opening 48 is located through the appropriate slot 44 or 45 in the lower plate 43 and then diametrically across the open side of the wheel cover and through the corresponding slot 41 or 42 in the upper plate 40 until its bent end 47 abuts against the outside of the lower plate 43. Then the padlock 50 is applied to the bar at the latter's opening 48, as shown in FIG. 6, to complete the locking assembly. It will be evident that only a relatively small axial clearance is needed between the open inner side of the wheel cover and the adjacent panel of the vehicle body to permit such assembly of the locking bar 46 and the padlock 50.

It should be understood that the plates 18 and 19 on the wheel cover in FIG. 1 or the plates 40 and 43 on the wheel cover in FIG. 6 need not be positioned one above the other, although that is the preferred arrangement. Instead they might be at the same level. Also, if desired these plates need not be 180° apart circumferentially of the wheel cover but might instead be spaced apart circumferentially by less than 180°, if desired. In the embodiment of FIG. 1, each plate 18 and 19 may have just one L-shaped slot or it may have more than two L-shaped slots, depending upon the variety of tire widths that the wheel cover may be expected to accommodate. Likewise, the plates 40 and 43 in the embodiment of FIG. 6 may have just one slot each or more than two slots, if desired.

I claim:

1. In combination with a wheel cover shaped and dimensioned to receive a vehicle spare wheel and tire, said wheel cover being open at its axially inward side for slidable assembly thereat with the spare wheel and tire, the improvement which comprises:

a pair of locking plates attached to said wheel cover and projecting axially from the wheel cover at its open axially inward side, said plates being spaced apart circumferentially around the wheel cover, each of said plates having a slot therein;

a rigid bar extending between said plates across the open axially inward side of the wheel cover and having its opposite ends slidably received in said slots in the respective plates;

and a padlock coacting with said bar at one end to retain the bar engaged in the slot in the adjoining plate;

said bar having a transverse segment at its opposite end extending closely outside the plate thereat for retaining said opposite end of the bar against withdrawal longitudinally through the slot in said last-mentioned plate.

2. The combination according to claim 1, wherein:

said bar has a transversely extending segment at each of its opposite ends which extends across the outside of the respective plate to prevent longitudinal withdrawal of the bar from the plates in either direction.

3. The combination according to claim 1, wherein:

said bar has an opening extending therethrough adjacent said one end which is located closely outside said adjoining plate when said transverse segment of the bar extends closely outside the other plate;

and said padlock has a pivoted U-shaped link extending snugly through said opening in the bar.

4. The combination according to claim 1, wherein:

each of said pair of locking plates has a pair of slots therein at different axial locations from said open axially inward side of the wheel cover for selectively receiving said bar when different width tires are in the wheel cover.

5. The combination of claim 4, wherein:

each of said slots is generally L-shaped, with a first leg thereof extending substantially circumferentially of the wheel cover and a second leg thereof extending axially from one end of said first leg away from the wheel cover;

and each locking plate has an additional slot which intersects said first leg of both of said generally L-shaped slots at the opposite end thereof from said second leg, said additional slot extending axially of the respective locking plate and being open at the edge of the latter away from the wheel cover for the slidable insertion of the bar thereat.

6. The combination of claim 5, wherein:

each of said locking plates has a pair of openings extending therethrough at the opposite side of the respective L-shaped slots from said additional slot;

and further comprising a padlock at each locking plate with a pivoted U-shaped link extending through one of said openings and through the adjacent L shaped slot at the intersection between its first and second legs.

7. The combination of claim 6, wherein:

said bar has transversely extending segments at it opposite ends which extend across the outside of the respective plates to prevent longitudinal withdrawal of the bar from the plates in either direction.

8. The combination of claim 1, wherein:

said slot in one of said plates is generally L-shaped, with a first leg thereof extending substantially circumferentially of the wheel cover and a second leg thereof extending axially from one end of said first leg away from the wheel cover;

and said one plate has an additional slot which intersects said first leg of said generally L-shaped slot at the opposite end thereof from said second leg, said additional slot extending axially of said one plate and being open at the edge of said one plate away from the wheel cover for slidably receiving the bar thereat.

9. The combination of claim 1, wherein:

each of said slots extends substantially circumferentially of the wheel cover;

said transverse segment on said opposite end of the bar extends axially away from the wheel cover outside said other plate;

said bar has an opening therein adjacent said one end which is located closely outside said adjoining plate when said transverse segment on said opposite end of the bar extends closely outside said other plate;

and said padlock has a pivoted U-shaped line extending snugly through said opening in the bar.

10. The combination of claim 9 wherein:

each of said plates has a pair of said slots extending substantially circumferentially of the wheel cover at different axial locations from said open axially inward side of the wheel cover.

* * * * *